(12) United States Patent
Satapathy et al.

(10) Patent No.: US 7,865,185 B1
(45) Date of Patent: Jan. 4, 2011

(54) SYSTEM AND METHOD FOR MULTIPLE ACCESS COMMUNICATIONS

(75) Inventors: Durga P. Satapathy, Olathe, KS (US); John W. Linebarger, Charlotte, NC (US); Tommie L. Holmes, Charlotte, NC (US)

(73) Assignee: Sprint Communications Company L.P., Overland Park, KS (US)

( * ) Notice: Subject to any disclaimer, the term of this patent is extended or adjusted under 35 U.S.C. 154(b) by 1273 days.

(21) Appl. No.: 10/035,620

(22) Filed: Dec. 28, 2001

(51) Int. Cl.
*H04W 4/00* (2009.01)

(52) U.S. Cl. ............. 455/426.2; 455/552.1; 455/556.1; 455/557; 370/310.1; 370/320

(58) Field of Classification Search ............. 455/426.1, 455/426.2, 3.01, 552.1, 553.1, 554.1, 554.2, 455/555, 556.1, 556.2, 557; 307/310.1, 310.2, 307/320, 395.1, 395.51
See application file for complete search history.

(56) References Cited

U.S. PATENT DOCUMENTS

| | | | | |
|---|---|---|---|---|
| 6,014,377 A | * | 1/2000 | Gillespie | 370/351 |
| 6,097,966 A | * | 8/2000 | Hanley | 455/555 |
| 6,131,136 A | | 10/2000 | Liebenow et al. | |
| 6,141,356 A | * | 10/2000 | Gorman | 370/493 |
| 6,223,054 B1 | * | 4/2001 | Katko | 455/554.2 |
| 6,427,071 B1 | * | 7/2002 | Adams et al. | 455/403 |
| 6,944,150 B1 | * | 9/2005 | McConnell et al. | 370/352 |
| 2003/0142664 A1 | * | 7/2003 | Gerszberg et al. | 370/354 |
| 2005/0013292 A1 | * | 1/2005 | Johnson et al. | 370/352 |

* cited by examiner

*Primary Examiner*—Temica M Beamer

(57) ABSTRACT

A system and method use multiple access technologies at an access device to increase capacity and throughput. The system comprises an access device configured to communicate with a wireline switch and a wireless switch. The access device may use one or more access technologies, including digital subscriber line protocols (xDSL), multipoint multichannel distribution system (MMDS), hybrid fiber coax (HFC), satellite, and other access technologies. Preferably the access device uses inverse multiplex asynchronous transfer mode (IMA) to inversely multiplex and multiplex wireline communications and wireless communications. The wireline switch is configured to communicate with the access device using wireline communications. The wireless switch is configured to communicate with the access device using wireless communications.

60 Claims, 1 Drawing Sheet

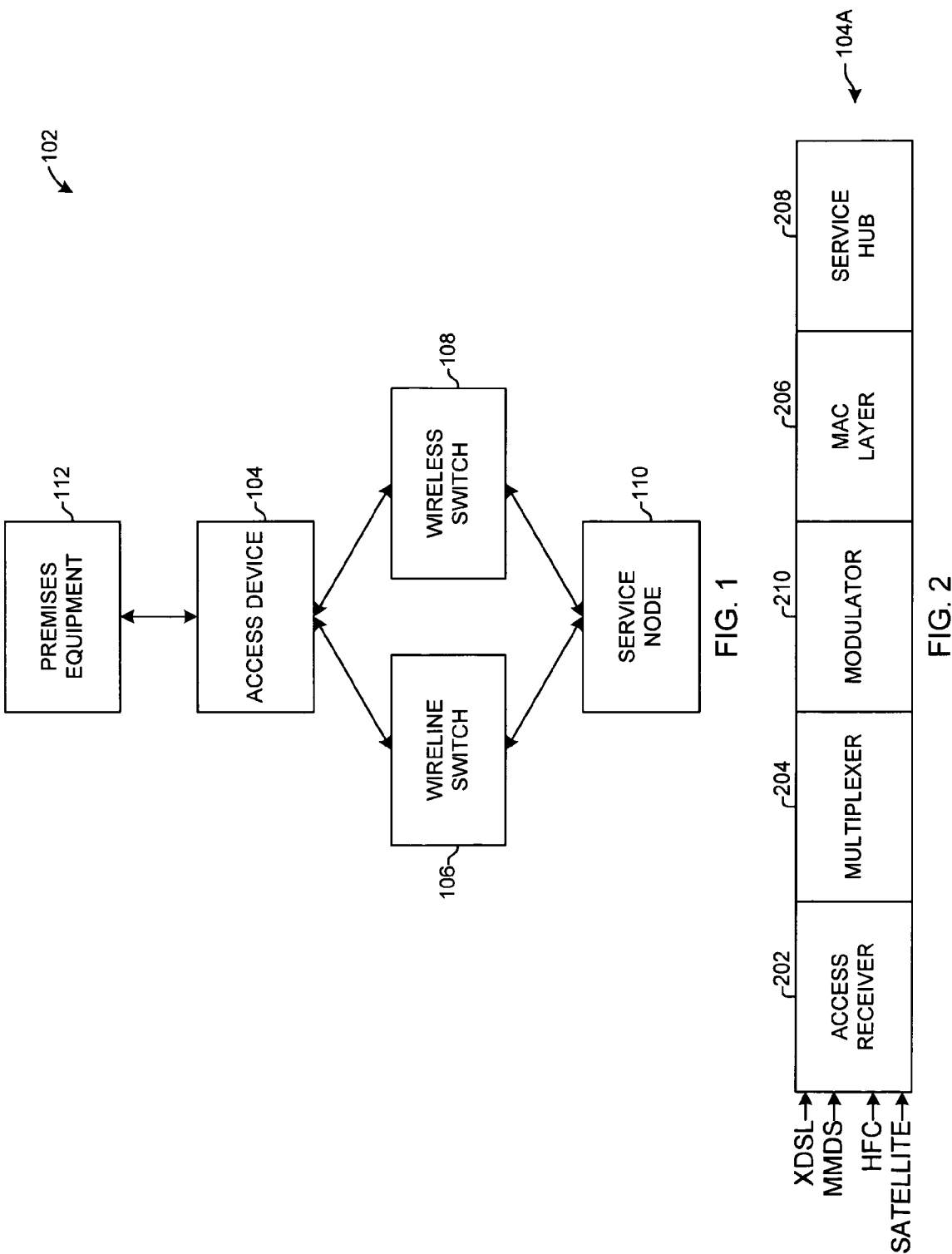

SYSTEM AND METHOD FOR MULTIPLE ACCESS COMMUNICATIONS

RELATED APPLICATIONS

Not Applicable

FEDERALLY SPONSORED RESEARCH OR DEVELOPMENT

Not Applicable

MICROFICHE APPENDIX

Not Applicable

FIELD OF THE INVENTION

The present invention relates to the field of transmitting and/or receiving communications using multiple access technologies.

BACKGROUND OF THE INVENTION

Many technologies are used by service providers to transmit communications to and from access devices, such as a telephone and/or a computer. In some instances, the service providers communicate using wireless communications, and in other instances the service providers use wireline communications to communicate with an access device. In these instances, the access device is configured to communicate using wireless communications or to communicate using wireline communications. However, many of these wireless access devices or wireline access devices have limitations based on their access protocol, the equipment and software being used, and the distances traveled by the communications between the access device and a switch or other switching device. In these configurations, increased capacity would be beneficial and enable the access devices to communicate at a greater rate and to have a higher throughput. The system and method of the present invention combine access technologies to create an improved system with improved capacity, throughput, and effectiveness.

SUMMARY OF THE INVENTION

The present invention is directed to a system for multiple access comprising a wireline switch configured to communicate using a wireline communication and a wireless switch configured to communicate using a wireless communication. The system also has an access device configured to communicate with the wireline switch and the wireless switch.

In another aspect, the present invention further is directed to a system for multiple access comprising a wireline switch configured to receive a first set of communications, to format the first set of communications as at least one wireline communication, and to transmit the at least one wireline communication. The system has a wireless switch configured to receive a second set of communications, to format the second set of communications as at least one wireless communication, and to transmit the at least one wireless communication. The system also has an access device configured to receive the at least one wireline communication and the at least one wireless communication.

In a further aspect, the present invention is directed to a system for multiple access. The system comprises an access transceiver configured to communicate using a wireline communication and a wireless communication. The system has a medium access control layer configured to control access to the access transceiver for communicating the wireline communication and the wireless communication. The system also has a service hub configured to communicate first data for the wireline communication and second data for the wireless communication for at least one premises communication.

Still further, in another aspect the present invention is directed to a method for multiple access comprising configuring a wireline switch to communicate using a wireline communication and configuring a wireless switch to communicate using a wireless communication. An access device is configured to communicate with the wireline switch and the wireless switch.

Further yet, in another aspect the present invention is directed to a method for multiple access comprising receiving a first set of communications at a wireline switch, formatting the first set of communications as at least one wireline communication, and transmitting the at least one wireline communication. A second set of communications is received at a wireless switch, formatting the second set of communications as at least one wireless communication, and transmitting the at least one wireless communication. The method further comprises receiving the at least one wireline communication and the at least one wireless communication at an access device.

BRIEF DESCRIPTION OF THE DRAWINGS

FIG. 1 is a block diagram of a communication system in accordance with an embodiment of the present invention.

FIG. 2 is a block diagram of an access device in a communication system in accordance with an embodiment of the present invention.

DETAILED DESCRIPTION

Many technologies are used to communicate between switches and access devices operated by end users. In some instances, a service provider operating one or more switches may use wireline communications and wireless communications to communicate with different access devices. For example, wireless communications may be used to communicate with a first access device. Another service provider or another switch may use wireline communications to communicate with a second access device. In addition, different protocols may be used to communicate with access devices, such as broadband and narrowband technologies. However, these technologies typically are oriented from the point of view of a service provider at a switch. Typically, only one access technology is used by a particular access device.

The system and method of the present invention use multiple access technologies at an access device to increase the capacity, throughput, and/or accessibility of the access device to receive and/or transmit communications. The invention is an advance over prior systems having only a single access technology. The present invention enables more effective and efficient communications, especially in areas where only a single access technology has limited capacity or does not have ideal connectivity.

The present invention uses wireline communications, such as digital subscriber line technologies (xDSL or DSL), including asymmetric digital subscriber line (ADSL) and other DSL technologies, and wireless communications, such as multipoint multichannel distribution service (MMDS) access technologies and other wireless access technologies. This use of multiple access technologies mitigates spectrum shortage problems for wireless solutions and increases wireline communication qualification rates, especially for xDSL qualification rates.

The present invention increases capacity and reliability of service provider offerings. It enables different service offerings and different service types to be accessed by a single access device. For example, a first set of communications for a first service offering can be transmitted through a first switch, such as a wireline switch. A second set of communications for a second service offering can be transmitted through a second switch, such as a wireless switch. The communications may contain data representative of voice based communications, interne protocol communications, video, media, digital data, such as facsimile data or computer based communications, and other data. In addition, the present invention mitigates the impact of non-line of sight (LOS) problems for LOS wireless technologies, such as LOS MMDS services.

FIG. 1 depicts an exemplary embodiment of a communication system of the present invention. The communication system 102 of FIG. 1 comprises an access device 104, a wireline switch 106, a wireless switch 108, and a service node 110. One or more premises equipment 112 may exist and transmit communications to, and/or receive communications from, the access device 104.

The access device 104 is a device configured to receive and/or to transmit wireline communications and wireless communications. The access device 104 is configured to use multiple access technologies, including wireline technologies and wireless technologies. The access device 104 may be configured to combine functionality for a DSL modem, a wireless modem, and/or other modems.

The access device 104 may use multiplexing protocols, such as inverse multiplex asynchronous transfer mode (IMA), when transmitting or receiving communications. For example, the access device 104 may receive a first portion of a communication from a wireline switch and a second portion of a communication from a wireless switch. The access device 104 may use the IMA protocol to recombine the portions of the communication into one communication. Likewise, the access device 104 may use the IMA protocol to transmit a first portion of a communication as a wireline communication and a second portion of a communication as a wireless communication. Other multiplexing protocols and techniques may be used. For example, the access device 104 may comprise an antenna configured to receive and transmit wireless communications, a computer, or other device.

The access device 104 also may be configured to use modulation and other processing for communications. For example, the access device 104 may modulate a communication using analog or digital modulation prior to transmitting a communication. In addition, the access device 104 may demodulate a received communication. The access device 104 also may be configured to encrypt, de-encrypt, encode, de-encode, or otherwise process communications to be transmitted or that are received.

The wireline switch 106 is a switch configured to transmit and/or receive wireline communications. For example, the wireline switch 106 may be a local exchange carrier (LEC) switch or an interexchange carrier (IXE) switch. Preferably, the wireline switch 106 comprises a digital subscriber line access multiplexer (DSLAM) to multiplex and demultiplex wireline communications. The wireline switch 106 also may transmit communications using hybrid fiber coax (HFC) system based communications. The wireline switch 106 can be configured to process the communications, such as with multiplexing, de-multiplexing, modulation, de-modulation, encryption, de-encryption, coding, decoding, and other processing techniques.

The wireless switch 108 is a switch configured to transmit and/or receive wireless communications. The wireless switch 108 may be, for example, a base station transmitting and receiving personal communication service (PCS) communications. In addition, the wireless switch 108 may use any of a variety of wireless communication spectrum, protocols, or signals, including PCS, code division multiplex access (CDMA), MMDS, unlicensed personal communications services (UPCS), industrial scientific medical (ISM), unlicensed national information infrastructure (UNII), satellite services, and other wireless spectrum protocols. The wireless switch 108 may be configured to process communications, such as with multiplexing, de-multiplexing, modulation, de-modulation, encryption, de-encryption, coding, decoding, and other processing techniques.

The service node 110 is a service node or point of presence configured to communicate with the wireline switch 106 and the wireless switch 108. While only a single service node 110 is depicted in FIG. 1, multiple service nodes may exist. For example, a first service node may communicate with the wireline switch 106, and a second service node may communicate with the wireless switch 108. Alternately, a single service node may communicate with both the wireline switch 106 and the wireless switch 108. The service node is configured to use the IMA protocol to inversely multiplex and multiplex communications. Other multiplexing protocols and other protocols may be used.

The premises equipment 112 receives communications from, and/or transmits communications to, the access device 104. The premises equipment 112 may be, for example, a telephone, a computer, a service hub, a transceiver, a set top box, a cable modem, another modem, or another device configured to transmit communications to, and/or receive communications from, the access device 104.

It will be appreciated that the configuration of the communication system 102 can be used for upstream and downstream communications. For example, upstream communications may be used for telephone voice services, while downstream communications may be used for satellite services. The configuration of the communication system 102 lends itself to differing access technologies and differing communication service types for upstream services and downstream services.

The configuration of the communication system 102 enables use of multiple access technologies, such as xDSL, MMDS, HFC, satellite, PCS, UPCS, ISM, UNII, and others to increase available bandwidth for the access device. It is not necessary to have all access technologies. Any suitable combinations can be implemented.

The communication system 102 of FIG. 1 operates as follows. In a first example, the service node 110 comprises a single service node. Communications for digital media are to be transmitted to the access device 104. In this example, the service node 110 uses IMA to inversely multiplex a communication stream into a first portion and a second portion. The first portion is transmitted to the wireline switch 106, and the second portion is transmitted to the wireless switch 108.

The wireline switch 106 transmits the first portion as wireline communications to the access device 104. The wireless switch 108 transmits the second portion as wireless communications to the access device 104.

The access device 104 receives the wireline communications from the wireline switch 106 and receives the wireless communications from the wireless switch 108. The access device 104 uses the IMA protocol to multiplex the communications received from the wireline switch 106 and the wireless switch 108 to one communication representing the digital media. The access device 104 transmits the one communication to the premises equipment 112.

In this example, the wireline communications were transmitted using xDSL, and the wireless communications were transmitted using MMDS spectrum. In this example, the access device 104 is greater than 50 kilofeet from the wireline switch 106, and unacceptable degradation of the bit rate would occur at 18 kilofeet from the wireline switch 106. Therefore, the wireless communications are used to increase the capacity and the bit rate with which the access device 104 receives the communications. As a result, in this example, the data rate for the combined wireline communications and wireless communications is not degraded beyond acceptable limits.

In another example, the service node 110 comprises 2 service nodes, each transmitting different service type communications. A first set of communications comprises data-based internet protocol (IP) communications. A second set of communications comprises voice based communications. In this example, the first set of communications are transmitted to the wireline switch 106 from a first service node, and the second set of communications are transmitted to the wireless switch 108 from a second service node.

The wireline switch 106 transmits the first set of communications as wireline communications using a DSLAM. The wireless switch 108 transmits the second set of communications as microwave communications.

The access device 104 receives the wireline communications and uses a DSL modem to de-multiplex the wireline communications. The access device 104 transmits the wireline communications to an associated premises equipment 112. In this example, the premises equipment 112 is a computer.

The access device 104 receives the wireless communications. In this example, the access device 104 also comprises an antenna configured to receive microwave communications. In this example, the access device 104 converts the wireless communications received via the antenna to digital communications that are transmitted to premises equipment 112. The premises equipment 112 converts the digital communications to analog communications for voice access. It will be appreciated that in other examples, the access device 104 converts the microwave communications to analog communications for voice access.

In another example, the access device 104 uses the IMA protocol to inversely multiplex communications to a first portion and a second portion. The access device 104 transmits the first portion as wireline communications to the wireline switch 106. The access device 104 transmits the second portion as wireless communications to the wireless switch 108. In other examples, the access device 104 transmits a first communication as a wireless communication and a second communication as a wireline communication using protocols and formatting other than IMA.

FIG. 2 depicts an exemplary embodiment of an access device. The access device 104A of FIG. 2 comprises an access transceiver 202, a multiplexer 204, a media access control (MAC) layer 206, a service hub 208, and a modulator 110.

The access transceiver 202 may be a receiver configured to receive wireline communications and wireless communications. For example, the access transceiver 202 may comprise an antenna and one or more ports configured to receive wireline communications. The access transceiver 202 may comprise a plain old telephone service (POTS) port, an xDSL port, an HFC connection, and/or other ports. In addition to the ports, the access transceiver 202 has the associated physical layer to enable communications over a given access media. The antenna may be configured to receive MMDS spectrum based communications, PCS system based communications, satellite communications, and/or other wireless communications. In addition to the antenna, the access transceiver 202 has communications elements, such as modems, codecs, and other communications elements, for the corresponding wireless communications media.

The multiplexer 204 is configured to multiplex and de-multiplex wireline communications and/or wireless communications. The multiplexer 204 receives and processes control signals from the MAC layer 206 specifying when and how to multiplex or demultiplex one or more communications. Preferably, the multiplexer 204 is configured to use the IMA protocol. The multiplexer 204 is optional.

The MAC layer 206 allocates communication resources, such as transmission duration, transmission power, and transmission bandwidth. For example, the MAC layer 206 may control how much spectrum is used, at what power, and for how long. The MAC layer 206 enables the access device 104A to dynamically split, combine, and/or direct resources for wireless communications and wireline communications.

The MAC layer 206 initiates and terminates all communication sessions. Thus, the MAC layer 206 receives, processes, and responds to control signals to set up links for reception of communications. The MAC layer 206 also generates control signals to set up links for transmission of communications and processes response control signals.

The MAC layer 206 also generates control signals to other devices, such as the multiplexer 204, specifying operations, such as when and how to multiplex or demultiplex one or more communications. The MAC layer 206 may generate control signals to other components of the access device 104A. For example, the MAC layer 206 may generate a control signal to the modulator 210 identifying modulation or demodulation parameters or to a signal processor (not shown) identifying formatting, such as an encryption technique.

The MAC layer 206 controls all inbound and outbound communications activity. The MAC layer 206 controls all activities of the access transceiver 202 and the multiplexer 204. The MAC layer 206 determines what protocol, spectrum, or signal type will be used at the access transceiver. For example, the MAC layer 206 may control MMDS spectrum based communications via an antenna and/or xDSL transmissions via an xDSL loop. Further, the MAC layer 206 optionally may be configured to control reception of wireline communications and wireless communications using various protocols, to control combining the communications received over different access media if needed into one logical data stream, to control demultiplexing transmit data into separate streams sent over different access media, and to control the reformatting of the communications as needed for transmission to, or reception by, premises equipment 112 or a switch.

The service hub 208 comprises interfaces configured to communicate with premises equipment, such as the premises equipment 112, by transmitting communications to, and/or receiving communications from, the premises equipment. Thus, for example, the service hub 208 may comprise one or more interfaces configured to communicate with one or more computers, telephones, set top boxes or other broadband devices, narrowband devices, other wireless devices, other wireline devices, or other premises equipment. The premises equipment may include a digital device or an analog device. Further, the premises equipment may include a wireline device or a wireless device.

The access device 104A also may include a modulator 210. The modulator 210 may be configured to modulate communications to be transmitted to the wireline switch 106 or the wireless switch 108 or to demodulate communications received from the wireline switch or the wireless switch. For example, the modulator 210 may be configured to modulate communications for MMDS spectrum or a PCS system. Other modulation techniques and examples exist. The modulator 210 is optional.

Those skilled in the art will appreciate that variations from the specific embodiments disclosed above are contemplated by the invention. The invention should not be restricted to the above embodiments, but should be measured by the following claims.

What is claimed is:

1. A system for multiple access comprising:
    an access device comprising an antenna and a wireline communication port;
    a wireline switch configured to communicate with the access device using a first wireline communication and a second wireline communication; and
    a wireless switch configured to communicate with the access device using a first wireless communication and a second wireless communication;
    wherein the access device is configured to receive data in a premises communication from a premises equipment and process a first portion of the data for transmission in the second wireless communication and process a second portion of the data for transmission in the second wireline communication; and
    wherein the access device further configured to receive the first wireline communication via the wireline communication port, to transmit the second wireline communication via the wireline communication port, to receive the first wireless communication via the antenna, and to transmit the second wireless communication via the antenna.

2. The system of claim 1 wherein at least one of the first and second wireless communications comprises at least one member of a group consisting of a multipoint multichannel distribution service spectrum communication, a code division multiplex access communication, a personal communication service communication, an unlicensed personal communications service spectrum communication, an industrial scientific medical spectrum communication, an unlicensed national information infrastructure spectrum communication, and a satellite service communication.

3. The system of claim 1 wherein at least one of the first and second wireline communications comprises at least one member of a group consisting of a digital subscriber line based communication and a hybrid fiber coaxial based communication.

4. The system of claim 1 wherein the access device and the wireline switch are not within line of sight.

5. The system of claim 1 wherein the access device is configured to process at least one member of a group consisting of the first and second wireless communications and the first and second wireline communications using an inverse multiplex asynchronous transfer mode protocol.

6. The system of claim 5 wherein the processing using inverse multiplex asynchronous transfer mode protocol comprises at least one member of a group consisting of multiplexing and de-multiplexing.

7. The system of claim 1 wherein the access device is further configured to use an inverse multiplex asynchronous transfer mode protocol to combine data from the first wireless communication and other data from the first wireline communication to form another premises communication.

8. The system of claim 7 further comprising the premises equipment configured to receive the other premises communication from the access device.

9. The system of claim 1 wherein the access device is configured to use an inverse multiplex asynchronous transfer mode protocol to process the first and second portions of the data.

10. The system of claim 1 wherein the access device comprises a digital subscriber line modem.

11. The system of claim 1 wherein the wireline switch comprises a digital subscriber line access multiplexer.

12. The system of claim 1 wherein the wireline switch comprises at least one member of a group consisting of a local exchange carrier switch and an interexchange carrier switch.

13. The system of claim 1 wherein the access device is configured to process at least one of the first and second wireless communications with at least one member of a group consisting of encryption, de-encryption, encoding, decoding, multiplexing, de-multiplexing, modulation, and demodulation.

14. The system of claim 1 wherein the access device is configured to process at least one of the first and second wireline communications with at least one member of a group consisting of encryption, de-encryption, encoding, decoding, multiplexing, de-multiplexing, modulation, and demodulation.

15. The system of claim 1 wherein the wireless switch is configured to process at least one of the first and second wireless communications with at least one member of a group consisting of encryption, de-encryption, encoding, decoding, multiplexing, de-multiplexing, modulation, and demodulation.

16. The system of claim 1 wherein the wireless switch is configured to process at least one of the first and second wireline communications with at least one member of a group consisting of encryption, de-encryption, encoding, decoding, multiplexing, de-multiplexing, modulation, and demodulation.

17. The system of claim 1 further comprising a service node configured to communicate with the wireless switch.

18. The system of claim 17 wherein the service node is configured to communicate with the wireless switch using at least one member of a group consisting of a third wireless communication and a third wireline communication.

19. The system of claim 17 wherein the service node is configured to use an inverse multiplex asynchronous transfer mode protocol to process a portion of data for transmission to the wireless switch.

20. The system of claim 1 further comprising a service node configured to communicate with the wireline switch.

21. The system of claim 20 wherein the service node is configured to communicate with the wireline switch using at least one member of a group consisting of a third wireless communication and a third wireline communication.

22. The system of claim 20 wherein the service node is configured to use an inverse multiplex asynchronous transfer mode protocol to process a portion of data for transmission to the wireline switch.

23. The system of claim 1 wherein each of the first and second wireless communications comprises a first service type communication and each of the first and second wireline communications comprises a second service type communication.

24. A system for multiple access comprising:
- a wireline switch configured to receive a first set of communications, to format the first set of communications as at least one wireline communication, and to transmit the at least one wireline communication;
- a wireless switch configured to receive a second set of communications, to format the second set of communications as at least one wireless communication, and to transmit the at least one wireless communication;
- an access device comprising an antenna and a wireline communication port, wherein the access device is configured to receive the at least one wireline communication via the wireline communication port and the at least one wireless communication via the antenna; and
- the access device further configured to receive data in a premises communication from a premises equipment and process a first portion of the data for transmission in a second wireless communication and process a second portion of the data for transmission in a second wireline communication.

25. The system of claim 24 wherein the first set of communications are formatted as a plurality of wireline communications, and the wireline switch is configured to transmit the plurality of wireline communications to the access device.

26. The system of claim 24 wherein the wireline switch comprises a digital subscriber line access multiplexer, and the digital subscriber line access multiplexer is configured to multiplex the first set of communications as at least one digital subscriber line wireline communication.

27. The system of claim 24 wherein the second set of communications are formatted as a plurality of wireless communications, and the wireless switch is configured to transmit the plurality of wireless communications to the access device.

28. The system of claim 24 wherein the access device is configured to format the wireless communication to a digital communication and to transmit the digital communication to the premises equipment.

29. The system of claim 28 wherein the digital communication comprises voice based data, and the premises equipment is configured to format the digital communication as an analog communication for voice access.

30. The system of claim 24 wherein the wireless communication comprises voice-based data, and the access device is configured to format the wireless communication to an analog communication for voice access and to transmit the analog communication to the premises equipment.

31. The system of claim 24 wherein the first set of communications comprises data representative of at least one member of a group consisting of voice-based data, internet protocol data, digital data, video data, and media data.

32. The system of claim 24 wherein the second set of communications comprises data representative of at least one member of a group consisting of voice-based data, internet protocol data, digital data, video data, and media data.

33. A system for multiple access comprising:
- an access transceiver comprising an antenna and a wireline communication port, wherein the access transceiver is configured to communicate using a wireline communication and a wireless communication;
- a medium access control layer configured to control access to the access transceiver for communicating the wireline communication and the wireless communication;
- a service hub configured to communicate first data for the wireline communication and a second data for the wireless communication for at least one premises communication; and
- a multiplexer configured to demultiplex the wireline communication and the wireless communication, and process the wireline communication and the wireless communication with an inverse multiplex asynchronous transfer mode protocol to generate another communication.

34. The system of claim 33 further comprising the multiplexer configured to multiplex at least one member of a group consisting of the first data and the second data.

35. The system of claim 34 wherein the multiplexer is configured to process the first data and the second data with the inverse multiplex asynchronous transfer mode protocol to generate the wireline communication and the wireless communication.

36. The system of claim 33 further comprising a modulator configured to modulate data from the premises communication for generation of at least one member of a group consisting of the wireline communication and the wireless communication.

37. The system of claim 33 further comprising a modulator configured to demodulate data from at least one member of a group consisting of the wireline communication and the wireless communication for generation of the premises communication.

38. The system of claim 33 wherein the access transceiver comprises at least one member of a group consisting of a plain old telephone service port, a digital subscriber line port, a hybrid fiber coaxial port, and an antenna.

39. The system of claim 33 further comprising a premises equipment comprising at least one member of a group consisting of a computer, a telephone, a set top box, and a narrowband device.

40. The system of claim 33 wherein the access transceiver is configured to transmit or receive the wireline communication via the wireline communication port and the wireless communication via the antenna.

41. The system of claim 33 wherein the medium access control layer is further configured to control a resource for combining the first data from the wireline communication and the second data from the wireless communication to the other communication.

42. The system of claim 33 wherein the service hub is configured to transmit or receive the premises communication.

43. A method for multiple access comprising:
- in a wireline switch, communicating using a wireline communication;
- in a wireless switch, communicating using a wireless communication;
- in an access device comprising an antenna and a wireline communication port, engaging in the wireline communication to communicate via the wireline communication port with the wireline switch and to engage in the wireless communication via the antenna to communicate with the wireless switch; and
- in the access device, using an inverse multiplex asynchronous transfer mode protocol to process at least one member of a group consisting of the wireless communication and the wireline communication.

44. The method of claim 43 further comprising receiving the wireless communication from the wireless switch at the access device and receiving the wireline communication from the wireline switch at the access device.

45. The method of claim 43 further comprising transmitting the wireless communication to the wireless switch from the access device and transmitting the wireline communication to the wireline switch from the access device.

46. The method of claim 43 further comprising, in the access device, receiving the wireless communication, receiving the wireline communication, and using the inverse multiplex asynchronous transfer mode protocol to combine data from the wireless communication and other data from the wireline communication to form a premises communication.

47. The method of claim 46 further comprising receiving the premises communication at a premises equipment from the access device.

48. The method of claim 43 further comprising, in the access device, using the inverse multiplex asynchronous transfer mode protocol to process a first portion of data for transmission in the wireless communication and to process a second portion of data for transmission in the wireline communication.

49. The method of claim 48 further comprising transmitting a premises communication to the access device from a premises equipment, the premises communication comprising the first portion of data and the second portion of data.

50. The method of claim 43 further comprising processing the wireless communication at the access device with at least one member of a group consisting of encryption, de-encryption, encoding, decoding, multiplexing, de-multiplexing, modulation, and demodulation.

51. The method of claim 43 further comprising processing the wireline communication at the access device with at least one member of a group consisting of encryption, de-encryption, encoding, decoding, multiplexing, de-multiplexing, modulation, and demodulation.

52. The method of claim 43 further comprising processing the wireless communication at the wireless switch with at least one member of a group consisting of encryption, de-encryption, encoding, decoding, multiplexing, de-multiplexing, modulation, and demodulation.

53. The method of claim 43 further comprising processing the wireline communication at the wireline switch with at least one member of a group consisting of encryption, de-encryption, encoding, decoding, multiplexing, de-multiplexing, modulation, and demodulation.

54. The method of claim 43 further comprising the wireless switch communicating with a service node.

55. The method of claim 54 further comprising communicating at the service node using at least one member of a group consisting of a wireless communication and a wireline communication.

56. The method of claim 55 further comprising communicating at the service node using the inverse multiplex asynchronous transfer mode protocol to process a portion of data for transmission to the wireless switch.

57. The method of claim 43 further comprising the wireline switch communicating with a service node.

58. The method of claim 57 further comprising communicating at the service node using at least one member of a group consisting of a wireless communication and a wireline communication.

59. The method of claim 57 further comprising communicating at the service node using the inverse multiplex asynchronous transfer mode protocol to process a portion of data for transmission to the wireline switch.

60. The method of claim 43 wherein the wireless communication comprises a first service type communication and the wireline communication comprises a second service type communication.

* * * * *